United States Patent
Akimoto

(10) Patent No.: US 10,250,785 B2
(45) Date of Patent: Apr. 2, 2019

(54) ELECTRONIC APPARATUS CAPABLE OF EFFICIENT AND UNIFORM HEAT DISSIPATION

(71) Applicant: CANON KABUSHIKI KAISHA, Tokyo (JP)

(72) Inventor: Takahiro Akimoto, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 15/642,416

(22) Filed: Jul. 6, 2017

(65) Prior Publication Data

US 2017/0302830 A1 Oct. 19, 2017

Related U.S. Application Data

(62) Division of application No. 15/041,473, filed on Feb. 11, 2016, now Pat. No. 9,819,844.

(30) Foreign Application Priority Data

Feb. 18, 2015 (JP) .................................. 2015-029499

(51) Int. Cl.
   *G06F 1/20* (2006.01)
   *H01M 10/613* (2014.01)
   (Continued)

(52) U.S. Cl.
   CPC ........... *H04N 5/2252* (2013.01); *G03B 17/55* (2013.01); *G06F 1/203* (2013.01); *H01M 10/613* (2015.04)

(58) Field of Classification Search
   CPC ........ H01M 10/613; G06F 1/203; G06F 1/20; H05K 3/32; H05K 7/1427; H05K 7/20736;
   (Continued)

(56) References Cited

U.S. PATENT DOCUMENTS 7,965,514 B2 * 6/2011 Hill ..................... H04M 1/0277
                                                        361/679.54
8,278,880 B2 * 10/2012 Nakajima .............. H04B 1/036
                                                        320/150
(Continued)

FOREIGN PATENT DOCUMENTS

JP  H01-259679 A  10/1989
JP  H09-298070 A  11/1997
(Continued)

OTHER PUBLICATIONS

Oct. 16, 2018 Japanese Office Action, which is enclosed, without translation, that issued in Japanese Patent Application No. 2015-029499.

*Primary Examiner* — Adam B Dravininkas
(74) *Attorney, Agent, or Firm* — Cowan, Liebowitz & Latman, P.C.

(57) ABSTRACT

An electronic apparatus capable of performing efficient dissipation of heat generated within the apparatus, thereby making uniform the exterior temperature of the apparatus, without increasing the manufacturing costs and size of the apparatus. The electronic apparatus includes a circuit board having an electric component as a heat source mounted thereon, a thermal connection member forming part of a battery chamber, a heat pipe having one end connected to the electric component and the other end thermally connected to the thermal connection member, and a battery insertion part forming part of the battery chamber. The battery insertion part is disposed closer to a battery insertion port than the thermal connection member is. The battery insertion part is formed of a material lower in thermal conductivity than the thermal connection member.

4 Claims, 5 Drawing Sheets

(51) Int. Cl.
*H04N 5/225* (2006.01)
*G03B 17/55* (2006.01)

(58) Field of Classification Search
CPC .. H05K 1/0203; H05K 7/2039; H05K 1/0209; H05K 1/181; H04N 5/2252; G03B 17/55
See application file for complete search history.

(56) References Cited

U.S. PATENT DOCUMENTS

| | | | | |
|---|---|---|---|---|
| 8,609,271 | B2* | 12/2013 | Yoon | H01M 2/0262 |
| | | | | 429/120 |
| 8,932,742 | B2* | 1/2015 | Yoon | F28D 15/0275 |
| | | | | 165/185 |
| 9,325,882 | B2* | 4/2016 | Kato | H04N 5/2252 |
| 2001/0019255 | A1 | 9/2001 | Park | |
| 2006/0216582 | A1 | 9/2006 | Lee et al. | |
| 2007/0231678 | A1* | 10/2007 | Park | H01M 10/625 |
| | | | | 429/62 |
| 2008/0014482 | A1* | 1/2008 | Yamamiya | H01M 8/04007 |
| | | | | 429/421 |
| 2008/0233470 | A1* | 9/2008 | Zhu | F28D 15/0233 |
| | | | | 429/90 |
| 2009/0086417 | A1 | 4/2009 | Hasegawa | |
| 2009/0109620 | A1* | 4/2009 | Wang | G06F 1/203 |
| | | | | 361/697 |
| 2009/0142628 | A1 | 6/2009 | Okada et al. | |
| 2010/0304202 | A1* | 12/2010 | Chou | H01M 2/105 |
| | | | | 429/120 |
| 2010/0330408 | A1 | 12/2010 | Yoon et al. | |
| 2011/0117410 | A1 | 5/2011 | Yoon | |
| 2011/0267777 | A1 | 11/2011 | Oike et al. | |
| 2011/0285647 | A1* | 11/2011 | Imamura | G06F 1/1616 |
| | | | | 345/173 |
| 2012/0021260 | A1* | 1/2012 | Yasui | F28D 15/0275 |
| | | | | 429/53 |
| 2012/0107664 | A1* | 5/2012 | Lee | H01M 2/1077 |
| | | | | 429/120 |
| 2013/0216888 | A1* | 8/2013 | Shimura | H01M 10/5002 |
| | | | | 429/120 |
| 2013/0344369 | A1* | 12/2013 | Miyakawa | H01M 2/1077 |
| | | | | 429/120 |
| 2015/0022718 | A1 | 1/2015 | Kano | |

FOREIGN PATENT DOCUMENTS

| | | |
|---|---|---|
| JP | 2000-032307 A | 1/2000 |
| JP | 2003-046828 A | 2/2003 |
| JP | 2006-319720 A | 11/2006 |
| JP | 2009-071762 A | 4/2009 |
| JP | 2009-278272 A | 11/2009 |
| JP | 2014-014015 A | 1/2014 |
| JP | 2014-158121 | 8/2014 |
| WO | 2010/032484 A1 | 3/2010 |

* cited by examiner

A--A CROSS-SECTION

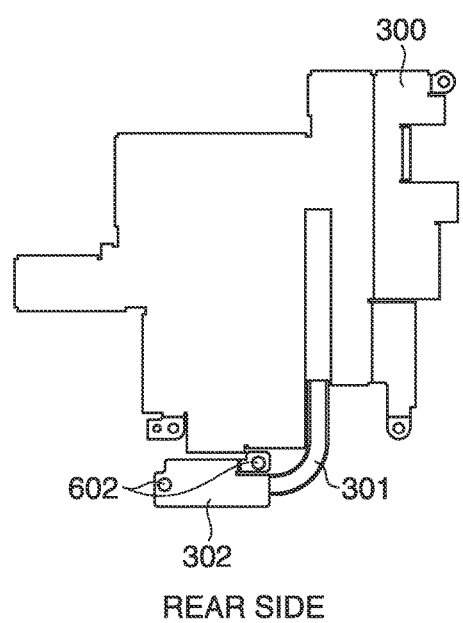
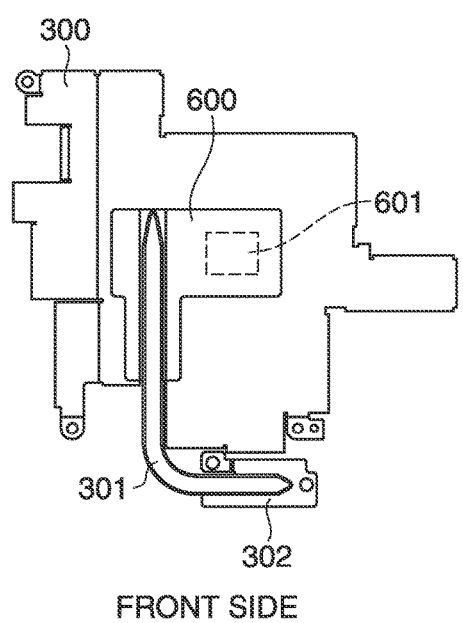
FIG. 5A — REAR SIDE
FIG. 5B — FRONT SIDE

ELECTRONIC APPARATUS CAPABLE OF EFFICIENT AND UNIFORM HEAT DISSIPATION

CROSS-REFERENCE TO RELATED APPLICATION

This application is a divisional of application Ser. No. 15/041,473, filed Feb. 11, 2016, the entire disclosure of which is hereby incorporated by reference.

BACKGROUND OF THE INVENTION

Field of the Invention

The invention relates to improvement of a heat dissipation technique for electronic apparatuses including an image pickup apparatus, such as a digital camera.

Description of the Related Art

In an electronic apparatus, such as a digital camera, most of heat generated in accordance with continuous operations of electric components including devices and an imaging engine mounted on a circuit board is dissipated via an exterior of the apparatus. However, particularly in recent years, heat generated within an apparatus tends to increase due to an increase in the number of pixels, higher integration of an image processing circuit, or higher photographing functionality for moving images. Further, downsizing of the apparatus makes it difficult to secure a sufficient distance between the electric components and the exterior.

For this reason, local heat spots occur on the exterior of the apparatus, and this makes a user feel uncomfortable when he/she touches the exterior. Further, in order to avoid further temperature rise, it is required to take measures e.g. for limiting the functionality of the apparatus so as to prevent continuous driving.

To solve the above-mentioned problems, there has been proposed a technique of conducting heat generated by an image pickup device to a cooling section of a battery chamber or the like via a high heat conductive member, such as a heat pipe, and then performs cooling with a cooling device, such as a fan, which is additionally attached to the battery chamber (see Japanese Patent Laid-Open Publication No. 2003-46828).

Further, there has been proposed a technique of conducting heat generated by electric components to a battery chamber via a heat pipe, and then performs cooling using a heat dissipation opening formed in the battery chamber in a manner exposed to the outside air (see Japanese Patent Laid-Open Publication No. 2009-71762). In this proposal, a cover member for heat insulation is additionally provided in the heat dissipation opening, thereby also enabling heat insulation of the battery chamber.

According to the technique proposed in Japanese Patent Laid-Open Publication No. 2003-46828, however, heat generated by the image pickup device is conducted to the battery chamber, using the heat pipe, and is then dissipated outside by the cooling device provided in the battery chamber. Therefore, it is necessary to additionally provide the cooling device, which inevitably increases the manufacturing costs and the size of the apparatus.

According to the technique proposed in Japanese Patent Laid-Open Publication No. 2009-71762, the battery chamber is formed with the heat dissipation opening, which causes concerns about dust-proof and drip-proof properties. Further, since the heat pipe has a high thermal conductivity, there is a possibility that heat spots will occur on the exterior of the apparatus at locations around a battery chamber-side end of the heat pipe.

SUMMARY OF THE INVENTION

The invention provides an electronic apparatus capable of performing efficient dissipation of heat generated within the apparatus, thereby making uniform the exterior temperature of the apparatus, without increasing the manufacturing costs and size of the apparatus.

The invention provides an electronic apparatus provided with a battery accommodation section that can accommodate a battery, comprising a substrate that has an electric component, which forms a heat source, mounted thereon, a heat dissipating member that forms part of the battery accommodation section, a first heat conductive member that has one end thermally connected to the electric component and another end thermally connected to the heat dissipating member, and an insertion port member that forms part of the battery accommodation section and is disposed at a location closer to a battery insertion port through which the battery is inserted than the heat dissipating member is, wherein the insertion port member is formed of a material lower in thermal conductivity than the heat dissipating member.

According to the invention, it is possible to efficiently dissipate heat generated within the apparatus, to thereby make the exterior temperature of the apparatus uniform, without increasing the manufacturing costs and size of the apparatus.

Further features of the invention will become apparent from the following description of exemplary embodiments (with reference to the attached drawings).

BRIEF DESCRIPTION OF THE DRAWINGS

FIG. 5A is a view of a shield member having a heat pipe integrally attached thereto, as viewed from the rear of the camera body.

FIG. 5B is a view of the shield member having the heat pipe integrally attached thereto, as viewed from the front of the camera body.

DESCRIPTION OF THE EMBODIMENTS

The invention will now be described in detail below with reference to the accompanying drawings showing an embodiment thereof.

Figure 1:
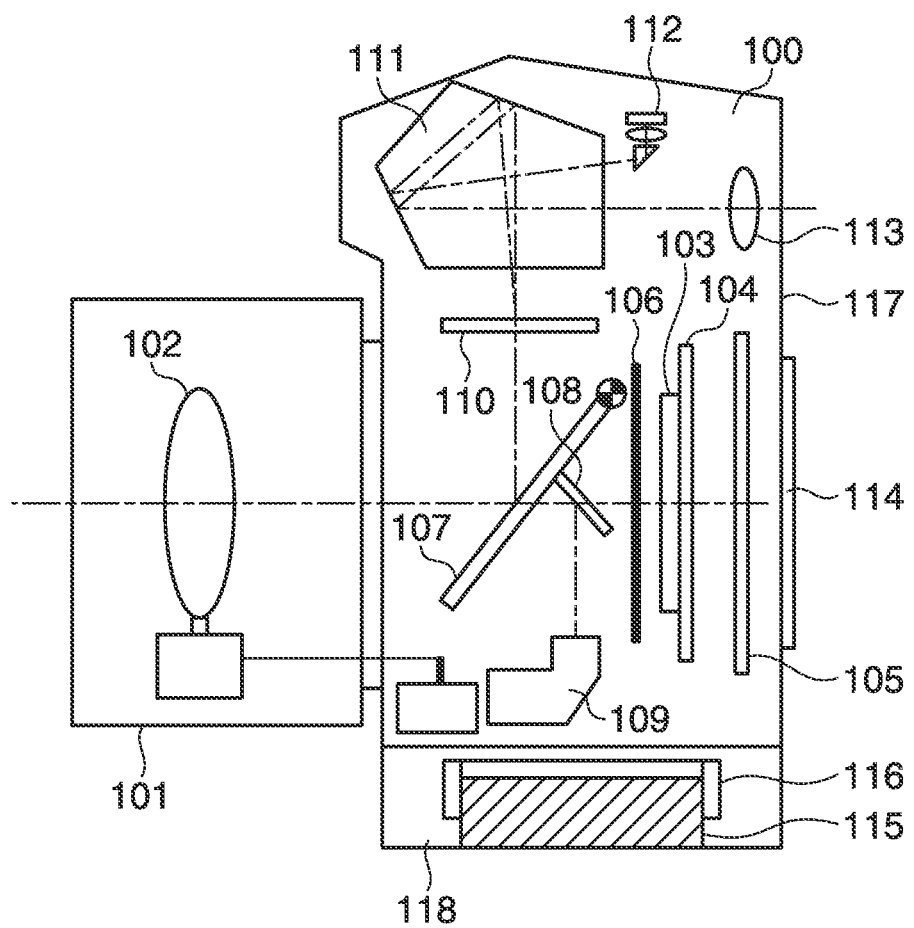
FIG. 1 is a schematic cross-sectional view of a digital single-lens reflex camera as an electronic apparatus according to an embodiment of the invention.

FIG. 1 is a schematic cross-sectional view of a digital single-lens reflex camera as an electronic apparatus according to the embodiment of the invention.

In the digital single-lens reflex camera of the embodiment, an exchangeable lens unit 101 is removably attached to a camera body 100 as shown in FIG. 1, and in this state, the lens unit 101 and the camera body 100 are communicably connected to each other. The lens unit 101 is provided with a plurality of lenses, such as a focus lens 102, a diaphragm, and so forth, which constitute a photographic optical system.

The camera body 100 has an image pickup device 103 implemented e.g. by a CCD sensor or a CMOS sensor. The image pickup device 103 is mounted on the front side (left side as viewed in FIG. 1) of a first circuit board 104, and converts an object light flux having passed through the photographic optical system of the lens unit 101 and having formed an image on an imaging surface thereof into an electric signal and outputs the electric signal. On the rear side of the first circuit board 104, there is provided a second circuit board 105. On each of the first circuit board 104 and the second circuit board 105, there are mounted various electric components, such as a CPU and an MPU, which perform image processing on an image signal output from the image pickup device 103, and system control.

Further, on the front side of the image pickup device 103, there is provided a mechanical shutter 106 for adjusting exposure time for exposure of the image pickup device 103, and on the front side of the mechanical shutter 106, there is provided a mirror unit comprised of a main mirror 107 and a sub mirror 108. The mirror unit is pivotally movable such that it can be positioned in a photographic optical path during finder observation as shown in FIG. 1 and can be positioned outside the photographic optical path during photographing.

During the finder observation, part of an object light flux having passed through the photographic optical system of the lens unit 101 passes through the main mirror 107 formed by a half mirror and is reflected on the sub mirror 108, whereby it is guided to a focus detecting section 109 that performs focus detection by a phase difference method.

On the other hand, part of the object light flux reflected upward on the main mirror 107 is guided to a focusing plate 110. The object light flux forms an object image on the focusing plate 110, and the object image formed on the focusing plate 110 is horizontally inverted by a pentaprism 111, whereafter it is guided to a finder eyepiece 113. This enables an object to be observed via the finder eyepiece 113. Note that a photometric element 112 measures the luminance of the object.

On a rear surface of the camera body 100, there is provided a display section 114 comprised of an LCD, for displaying photographing conditions, composition, a photographed image, and so forth. In a bottom of the camera body 100, there is formed a battery chamber 118 for accommodating a battery 115. The battery chamber 118 is provided with a thermal connection member 116 formed with an accommodation recess for accommodating part of the battery 115 and thermally connected to an exterior member 117 of the camera body 100. The thermal connection member 116 is formed e.g. of an aluminum material excellent in thermal conductivity.

Although in the embodiment, the digital single-lens reflex camera including the mirror unit and the pentaprism 111 is shown by way of example, this is not limitative, but the electronic apparatus of the invention may be formed by a mirrorless camera configured to perform photographing after observation of a photographed image on the display section 114 or another kind of electronic apparatus. Alternatively, the electronic apparatus may be formed e.g. by a compact camera which has a lens unit and a camera body integrally secured to each other.

Figure 2:
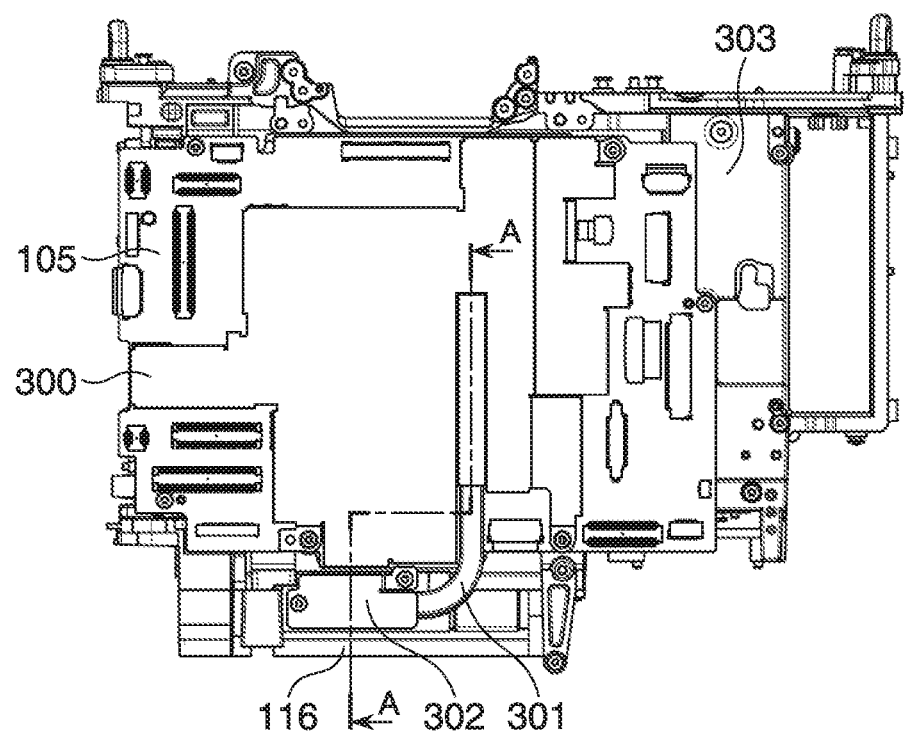
FIG. 2 is a view of an internal construction of a camera body having an exterior member removed therefrom, as viewed from the rear of the camera body.

Next, a description will be given, with reference to FIGS. 2 and 3, of the internal construction of the camera body 100. FIG. 2 is a view of the internal construction of the camera body 100 having the exterior member 117 removed therefrom, as viewed from the rear of the camera body 100, and FIG. 3 is a cross-sectional view taken on line A-A of FIG. 2.

Figure 3:
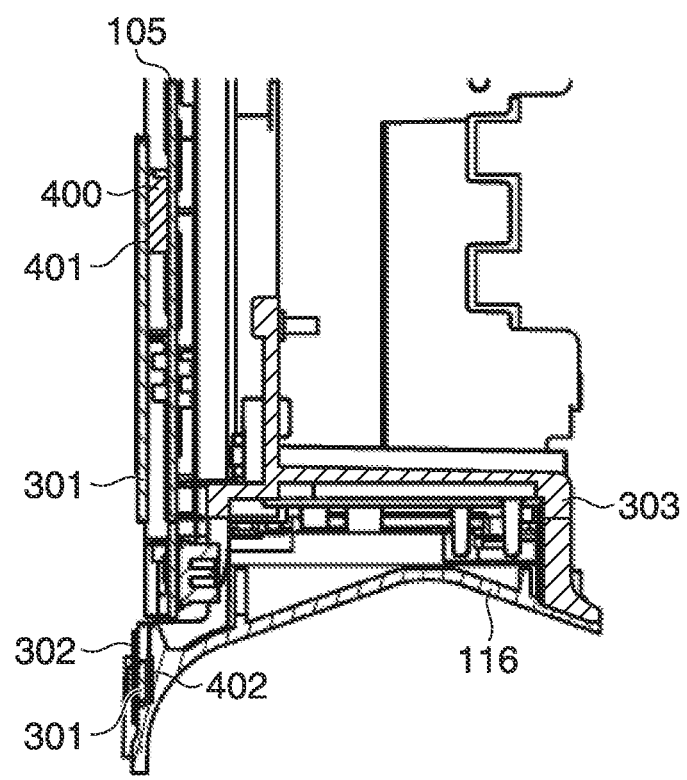
FIG. 3 is a cross-sectional view taken on line A-A of FIG.

Referring to FIGS. 2 and 3, a shield member 300 is provided for electromagnetically shielding the electric components mounted on the second circuit board 105. A portion of one end (upper end, as viewed in FIGS. 2 and 3, i.e. heat absorbing side) of a heat pipe 301 is inserted into the shield member 300, whereby the heat pipe 301 is integrally formed with the shield member 300.

The shield member 300 having the heat pipe 301 integrally connected thereto is secured to the second circuit board 105 with clips, screws, or the like which are mounted on the second circuit board 105. A first electric component 400 which is mounted on the second circuit board 105 and forms a heat source is in thermal contact with the one end of the heat pipe 301 via a second heat conductive member 401. The heat pipe 301 corresponds to a first heat conductive member of the invention.

Further, a first copper plate 302 is fixed to the other end (heat dissipating side) of the heat pipe 301 e.g. by soldering. As shown in FIG. 3, the first copper plate 302 is secured such that the other end of the heat pipe 301 is held in contact, with the thermal connection member 116 via a third heat conductive member 402. The thermal connection member 116 is secured to a body chassis 303, and the body chassis 303 is secured to the exterior member 117 e.g. with screws.

Here, if the thermal connection member 116 were directly fixed to the exterior member 117 with screws, heat from the thermal connection member 116 in a high-temperature condition would be transferred to the screws securing the exterior member 117, causing the heads of the respective screws to form heat spots.

In the present embodiment, since high-temperature heat transferred from the heat pipe 301 to the thermal connection member 116 is transferred to the exterior member 117 via the body chassis 303, it is possible to make the temperature of the exterior uniform without causing the screws securing the exterior member 117 to form heat spots. In this case, it is preferable that the body chassis 303 is fastened with screws to the exterior member 117 at a plurality of locations, e.g. on the front, rear, and sides of the camera body 100. By doing this, it is possible to transfer heat from the thermal connection member 116 to the whole of the eater or via the body chassis 303, so that it is advantageous in making the exterior temperature uniform and causing efficient heat dissipation.

Note that the exterior member 117 may be formed of a resin material, or alternatively a metal material or a resin material having high thermal conductivity may be used to form the same. Further, the material of the thermal connection member 116 is not limited to an aluminum material, but the thermal connection member 116 may be formed of a resin material having high thermal conductivity or a metal material subjected to alumite treatment. This not only improves dissipation of heat from the exterior surface, but also it is effective in thermal insulation of a battery under a low-temperature environment.

Figure 4:
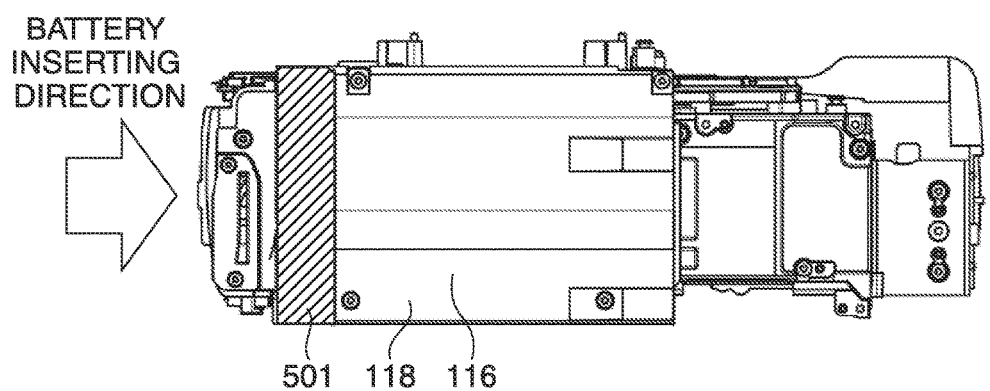
FIG. 4 is view of the internal construction of the camera body having the exterior member removed therefrom, as viewed from the bottom of the camera body.

FIG. 4 is a view of the internal construction of the camera body 100 having the exterior member 117 removed therefrom, as viewed from the bottom of the camera body 100. As shown in FIG. 4, the battery chamber 118 is provided with a battery insertion part 501 formed with a battery insertion port, and the battery insertion part 501 is connected to the thermal connection member 116. The battery insertion part 501 is formed e.g. of a resin material having a thermal conductivity which is lower than that of the thermal connection member 116. The battery 115 inserted from the battery insertion port into the battery chamber 118 is received and held in the accommodation, recess of the thermal connection member 116.

With this, even if a user accidentally touches the battery chamber 118 e.g. for battery replacement when the thermal connection member 116 is in a high-temperature state immediately after termination of photographing operation, it is possible to avoid making the user feel uncomfortable. Note that the thermal connection member 116 and the battery insertion part 501 are not required to be formed as different members, but may be formed as a single member e.g. by two-color molding.

FIG. 5A is a view of the shield member 300 having the heat pipe 301 integrally attached thereto, as viewed from the rear of the camera body 100, and FIG. 5B is a view of the shield member 300 in the FIG. 5 state, as viewed from the front of the camera body 100.

A second copper plate 600 is integrally fixed to the upper end of the heat pipe 301, i.e. a heat absorbing-side end of the same which is in contact with the second circuit board 105, e.g. by soldering. The second copper plate 600 is fixed to the shield member 300 e.g. by soldering. Even when a heat generating component is disposed at a location away from the heat pipe 301, as in the case of a second electric component 601, by changing the shape of the second copper plate 600, it is possible to dissipate heat from such a heat source distant from the heat pipe 301 as the second electric component 601. Note that instead of providing the second copper plate 600, the shield member 300 may be formed with a recess and the heat pipe 301 may be fixed to the recess e.g. by soldering.

It is preferable that each of the second heat conductive member 401 disposed on the heat absorbing side of the heat pipe 301 and the third heat conductive member 402 disposed on the heat dissipating side of the heat pipe 301 and in contact with the thermal connection member 116 is formed of a material having flexible elasticity in a direction of its thickness. This makes it possible to ensure reliable thermal contact by elasticity of the second heat conductive member 401 and the third heat conductive member 402 even if variation occurs in the thickness direction of the camera body 100 due to tolerances of components including the heat pipe 301.

Further, it is preferable that each screw insertion hole 602 through which a screw is inserted to secure the heat pipe 301 to the thermal connection member 116 is formed such that it has a relatively large diameter. With this, it is possible to secure the heat pipe 301 to the thermal connection member 116 without stress even if there occurs a component variation of the heat pipe 301 or a variation in assembling the same. Note that by covering the heat pipe 301 with a heat insulating member, not shown, it is possible to prevent occurrence of a heat spot due to unexpected transfer of heat to the exterior member 117 as well as to improve heat transfer efficiency of the heat pipe 301.

As described heretofore, according to the present embodiment, it is possible to efficiently dissipate heat generated within the camera body 100 to thereby make the exterior temperature uniform. Further, since it is not required to additionally provide a cooling device, it is possible to avoid an increase in the manufacturing costs and size of the camera. Furthermore, in the present embodiment, since it is not required to form a heat dissipating opening in the exterior member 117, dust-proof and drip-proof properties cannot be affected.

While the invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2015-029499 filed Feb. 18, 2015 which is hereby incorporated by reference herein in its entirety.

What is claimed is:

1. An electronic apparatus provided with a battery accommodation section that can accommodate a battery, comprising:
a substrate that has an electric component, which forms a heat source, mounted thereon;
a heat dissipating member that is formed in the battery accommodation section so as to receive and hold the battery when the battery is accommodated in the accommodation section;
a first heat conductive member that has one end thermally connected to the electric component and another end thermally connected to said heat dissipating member; and
an insertion port member that forms part of the battery accommodation section and is connected to said heat dissipating member at a location closer to a battery insertion port through which the battery is inserted than a remaining portion of said heat dissipating member,
wherein said insertion port member is formed of a material lower in thermal conductivity than said heat dissipating member.

2. The electronic apparatus according to claim 1, wherein said heat dissipating member is thermally connected to a chassis.

3. The electronic apparatus according to claim 1, wherein said first heat conductive member is a heat pipe.

4. The electronic apparatus according to claim 1, wherein said heat dissipating member has been subjected to alumite treatment.

* * * * *